(12) United States Patent
Hunter (10) Patent No.: US 9,509,223 B2
(45) Date of Patent: Nov. 29, 2016

(54) LLC BIDIRECTIONAL RESONANT CONVERTER AND METHODS OF CONTROLLING

(75) Inventor: Phillip Mark Hunter, Christchurch (NZ)

(73) Assignee: Eaton Industries Company (NZ)

( * ) Notice: Subject to any disclaimer, the term of this patent is extended or adjusted under 35 U.S.C. 154(b) by 0 days.

(21) Appl. No.: 14/368,187

(22) PCT Filed: Feb. 20, 2012

(86) PCT No.: PCT/NZ2012/000017
§ 371 (c)(1),
(2), (4) Date: Jun. 23, 2014

(87) PCT Pub. No.: WO2013/095161
PCT Pub. Date: Jun. 27, 2013

(65) Prior Publication Data
US 2014/0347893 A1    Nov. 27, 2014

(30) Foreign Application Priority Data
Dec. 21, 2011 (NZ) ........................ 597288

(51) Int. Cl.
*H02M 3/335* (2006.01)

(52) U.S. Cl.
CPC ..... *H02M 3/33584* (2013.01); *H02M 3/33507* (2013.01); *H02M 3/33569* (2013.01); *H02M 3/33592* (2013.01); *Y02B 70/1433* (2013.01)

(58) Field of Classification Search
CPC ............. H02M 3/337; H02M 3/3376; H02M 3/33584; H02M 2007/4815; H02M 3/33569; H02M 3/33592
See application file for complete search history.

(56) References Cited

U.S. PATENT DOCUMENTS

| 5,388,040 | A | 2/1995 | Hall |
| 7,692,937 | B2* | 4/2010 | Zeng ................. H02M 3/33576 363/17 |
| 2007/0285952 | A1 | 12/2007 | Zeng et al. |
| 2009/0303753 | A1 | 12/2009 | Fu et al. |
| 2013/0121033 | A1* | 5/2013 | Lehn ..................... H02M 3/335 363/17 |

OTHER PUBLICATIONS

Snubberless Bidirectional DC-DC Converter With New CLLC Resonant Tank Featuring Minimized, Switching Loss, Wei Chen, Ping Rong, and Zhengyu Lu, Senior Member, IEEE, Sep. 2010 http://ieeexplore.ieee.org/stamp/stamp.jsp?tp=&arnumber=5342515.*
Jalbrzykowsk et al., *A Bidirectional DC-DC Converter for Renewable Energy Systems*, Bulletin of the Polish Academy of Sciences Technical Sciences, vol. 57, No. 4, pp. 363-368, Dec. 31, 2009.
Pledl et al., *Theory of Operation, Design Procedure and Simulation of a Bidirectional LLC Resonant Converter for Vehicular Applications*, Vehicle Power and Propulsion Conference, IEEE, Sep. 1, 2010, 5 Pages.
International Search Report, PCT/NZ2012/000017, Aug. 10, 2013.

* cited by examiner

*Primary Examiner* — Fred E Finch, III
*Assistant Examiner* — Rafael O. De León Domenech
(74) *Attorney, Agent, or Firm* — Myers Bigel, P.A.

(57) ABSTRACT

A LLC bidirectional resonant converter comprising: a resonant tank, a first switching circuit connected to the resonant tank via first power conduits, a second switching circuit connected to the resonant tank via second power conduits, a switching element, and at least one switchable inductive element which is arranged by the switching element to be in parallel across the second power conduits when operating in a first mode of operation and arranged by the switching element to be in parallel across the first power conduits when operating in a second mode of operation.

27 Claims, 5 Drawing Sheets

LLC BIDIRECTIONAL RESONANT CONVERTER AND METHODS OF CONTROLLING

RELATED APPLICATIONS

The present application is a 35 U.S.C. §371 national phase application of PCT International Application No. PCT/NZ2012/000017, having an international filing date of Feb. 20, 2012, claiming priority to New Zealand Patent Application No. 597288, filed Dec. 21, 2011. The disclosures of each application are incorporated herein by reference in their entireties. The above PCT International Application was published in the English language and has International Publication No. WO 2013/095161.

FIELD OF THE INVENTION

The present invention relates to a LLC bidirectional resonant converter and method of controlling a LLC bidirectional resonant converter. In particular, the present invention relates to a LLC bidirectional resonant converter having an inductive element arranged across a first or second power conduit dependent upon a mode of operation, and method of controlling said LLC bidirectional resonant converter.

BACKGROUND

Over the history of development of switched mode power supply systems (SMPS) or resonant converters, the rectifier circuit side of the converter has increased in complexity.

In traditional resonant SMPS, the rectifier circuit portion of the SMPS included conventional semiconductor diode rectification components, which rectified the voltage signal produced by the resonant tank portion of the converter. In order to control the output voltage of the converter, the frequency at which the resonant tank was switched was varied.

In order to make this form of converter more efficient, synchronous rectification was introduced. Synchronous rectification involves placing semiconductor switches in parallel with (or replacing) the conventional rectifier diodes. Typically the semiconductor switches are MOSFET (Metal Oxide Semiconductor Field Effect) devices. However the MOSFET devices could be replaced by IGBT (Insulated Gate Bipolar Transistor) devices or a number of alternate devices.

Figure 1:
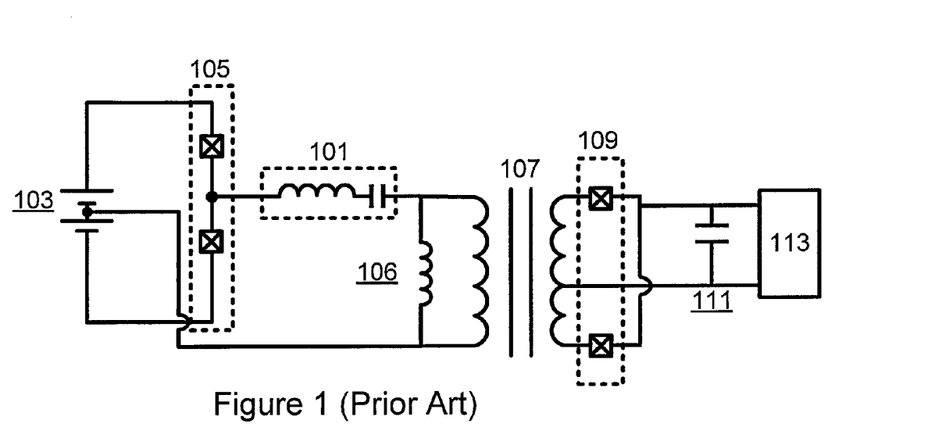
FIG. 1 shows a known resonant converter circuit.

For example, a typical SR circuit is shown in FIG. 1. A resonant tank 101 consisting of a capacitive element and an inductive element in series receives power from a power source 103 via a switch circuit 105. A shunt inductor 106 is placed in parallel across the primary winding of an isolation transformer 107. The output of the isolation transformer 107 includes synchronous rectification switching devices 109, which provide output power to a load 113 via a smoothing capacitor 111.

This type of LLC circuit has the ability to provide output voltage control by operating in either the buck or boost regions. Further, the recent shift in industry standard practice to employ this type of output synchronous rectification has resulted in the capability of providing bidirectional power conversion. It has been discovered that the conventional LLC series resonant circuit has an asymmetric transfer function, where the input to output transfer function (i.e. forward transfer function) is different to the output to input transfer function (i.e. reverse transfer function).

However, it has been found that the reverse transfer function does not facilitate practical reverse power flow control. For example, if the power flow is reversed, the inductive loading provided across the source does not provide any useful function.

An object of the present invention is to provide a LLC bidirectional resonant converter with improved forward and reverse power flow control or to at least provide the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

According to one aspect, the present invention provides a LLC bidirectional resonant converter comprising: a resonant tank, a first switching circuit connected to the resonant tank via first power conduits, a second switching circuit connected to the resonant tank via second power conduits, a switching element, and at least one switchable inductive element which is arranged by the switching element to be in parallel across the second power conduits when operating in a first mode of operation and arranged by the switching element to be in parallel across the first power conduits when operating in a second mode of operation.

According to second aspect, the present invention provides a method of controlling a LLC bidirectional resonant converter comprising the steps of: switching the bidirectional resonant converter between a first mode of operation where the bidirectional resonant converter is arranged to operate in a forward power transfer mode, and a second mode of operation where the bidirectional resonant converter is arranged to operate in a reverse power transfer mode, and controlling a switching element based on the mode of operation in which the bidirectional resonant converter is operating, where the switching element is arranged to connect at least one inductive element in parallel across either first power conduits between a first switching circuit and a resonant tank or second power conduits between the resonant tank and a second switching circuit dependent upon the mode of operation in which the bidirectional resonant converter is operating.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

Figure 2A:
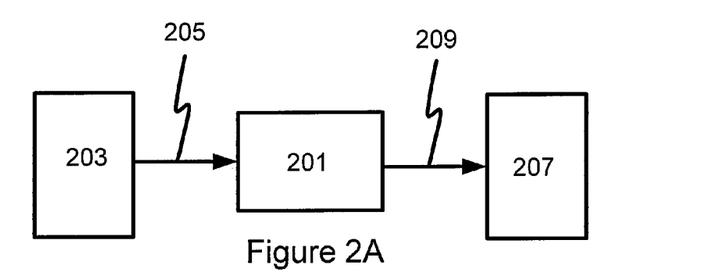
FIG. 2A shows a conceptual diagram of a bidirectional resonant converter operating in a first mode of operation according to an embodiment of the present invention.

FIG. 2A shows a conceptual diagram of a bidirectional resonant converter operating in a first mode of operation according to this embodiment.

A resonant tank 201 is connected to a first switch arrangement 203 via a first set of power conduits 205. The resonant tank 201 is also connected to a second switch arrangement 207 via a second set of power conduits 209.

In a first mode of operation, the bidirectional resonant converter is arranged to operate in a forward power transfer mode where the power is transferred in the direction of the arrows indicated in FIG. 2A, i.e. from the first switch arrangement 203 to the resonant tank 201 and on to the second switch arrangement 207. When the resonant converter is operated in the first mode, the first switch arrangement 203 controls the power being supplied to the resonant tank and the second switch arrangement 207 operates as a synchronous rectifier.

Figure 2B:
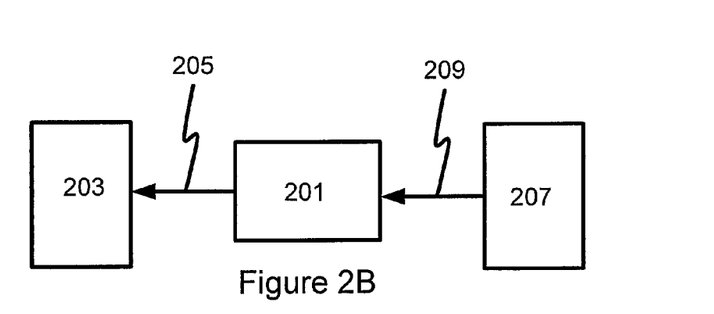
FIG. 2B shows a conceptual diagram of a bidirectional resonant converter operating in a second mode of operation according to an embodiment of the present invention.

FIG. 2B shows a conceptual diagram of a bidirectional resonant converter operating in a second mode of operation.

The resonant tank 201 is still connected to the first switch arrangement 203 via the first set of power conduits 205. The resonant tank 201 is also still connected to the second switch arrangement 207 via the second set of power conduits 209. However, in this second mode of operation, the bidirectional resonant converter is arranged to operate in a reverse power transfer mode where the power is transferred in the direction of the arrows indicated in FIG. 2B, i.e. from the second switch arrangement 207 to the resonant tank 201 and on to the first switch arrangement 203. When the converter is placed in this second mode, the second switch arrangement 207 controls the power being supplied to the resonant tank and the first switch arrangement 203 operates as a synchronous rectifier.

Figure 3:
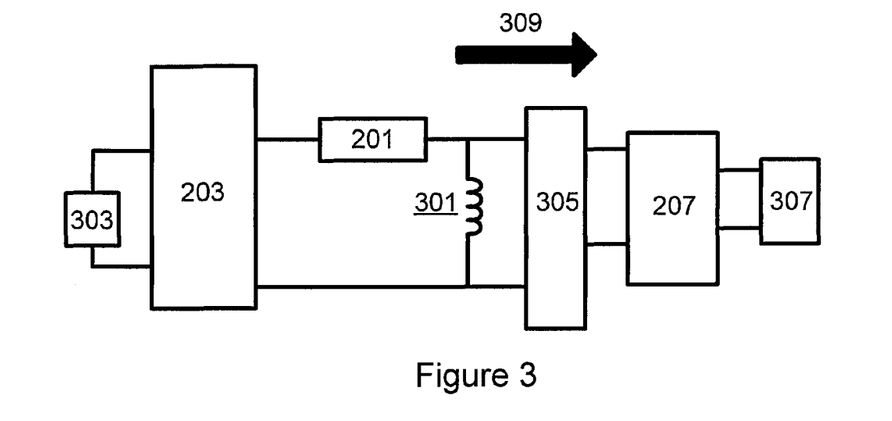
FIG. 3 shows a block circuit diagram of a bidirectional resonant converter operating in a first mode of operation according to an embodiment of the present invention.

FIG. 3 shows a circuit block diagram of the bidirectional resonant converter operating in the first mode of operation.

The resonant tank 201 is shown connected to the first switch arrangement 203. A resonant shunt inductor 301 is arranged in parallel across the second set of power conduits. That is, the resonant shunt inductor 301 is effectively arranged in parallel across the second switch arrangement 207. Power from a power source 303 is switched by the first switch arrangement 203 to drive the resonant tank 201.

According to this embodiment, an isolation transformer 305 is provided to transfer power from the resonant tank to the second switch arrangement. The isolation transformer isolates the resonant tank and the first switch arrangement from the second switch arrangement 207 and the load 307. It will be understood however that, as an alternative, the isolation transformer may be an auto transformer if primary to secondary voltage/current transformation is required but isolation is not. As a further alternative, if primary to secondary voltage/current transformation is not required, the second switch arrangement may be connected directly to the resonant circuit.

The forward transfer of power is indicated by arrow 309.

Figure 4:
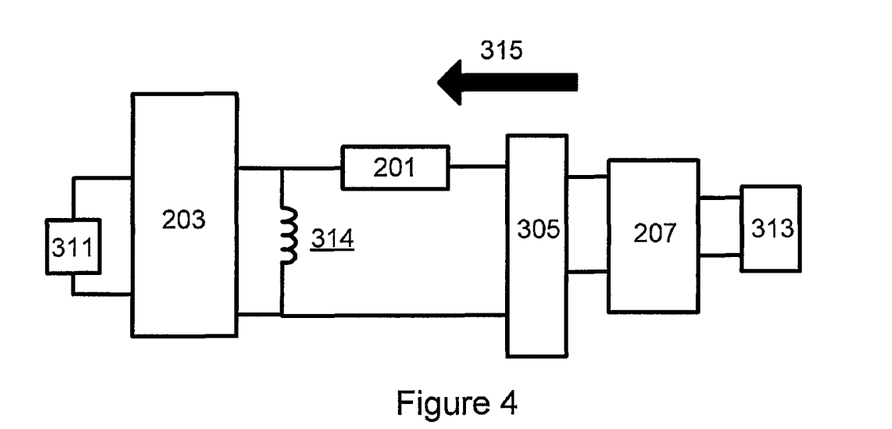
FIG. 4 shows a block circuit diagram of a bidirectional resonant converter operating in a second mode of operation according to an embodiment of the present invention.

FIG. 4 shows a circuit block diagram of the bidirectional resonant converter operating in the second mode of operation.

In this second mode of operation, the bidirectional resonant converter operates in a reverse power transfer mode. Therefore, the original power source 303 becomes a load 311 and the original load 307 becomes the new power source 313. A resonant shunt inductor 314 is arranged in parallel across the first set of power conduits. That is, the resonant shunt inductor 314 is effectively arranged in parallel across the first switch arrangement 203. Power from the new power source 313 is switched by the second switch arrangement 207 to drive the resonant tank 201.

The reverse transfer power is indicated by arrow 315.

As shown in FIG. 3, in the first mode of operation, the first switch arrangement 203 is controlled using a first switching sequence. Further, in this first mode of operation, the second switch arrangement 207 is controlled using a second switching sequence.

As shown in FIG. 4, in the second mode of operation, the first switch arrangement 203 is controlled using a third switching sequence. Further, in this second mode of operation, the second switch arrangement 207 is controlled using a fourth switching sequence.

It will be understood that the first and fourth switching sequences are used to control the amount of power being applied to the resonant tank 201, and the second and third switching sequences are used to synchronise the output of the rectifier circuit.

Figure 5:
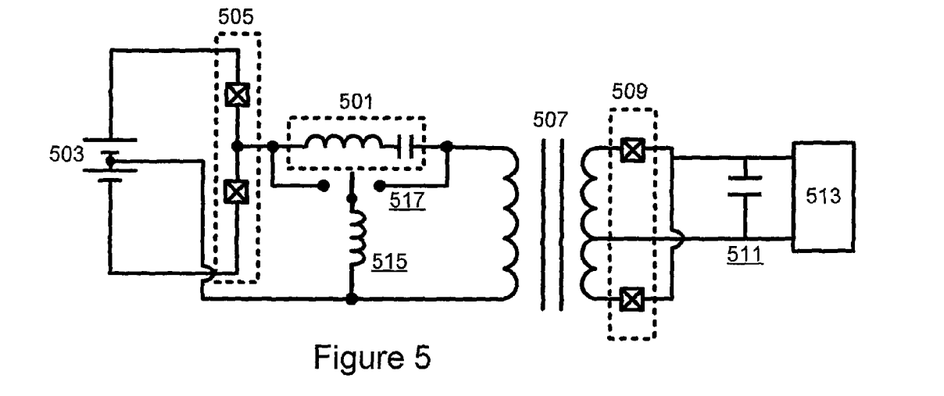
FIG. 5 shows a circuit diagram of a bidirectional resonant converter according to an embodiment of the present invention.

FIG. 5 shows a circuit diagram of a bidirectional resonant converter according to this embodiment of the present invention.

A resonant tank 501 includes an inductive element and capacitive element arranged in series. A power source 503 provides power to the resonant tank 501 via a first switch arrangement 505.

According to this embodiment, the first switch arrangement 505 may be a half bridge arrangement including two MOSFET (Metal Oxide Semiconductor Field Effect Transistor) devices.

It will be understood that alternative devices may be used for synchronous rectification such as IGBT (Insulated Gate Bipolar Transistor) devices or a number of alternate devices.

It will also be understood that the first switch arrangement may be modified to take on the form of a full bridge drive circuit. Further, the drive circuit may be arranged to employ zero voltage transition (ZVT) switching A primary winding on an isolation transformer 507 receives the output from the resonant tank. The isolation transformer 507 enables power to be transferred from the resonant tank 501 to the output side of the circuit. On the secondary winding side of the isolation transformer 507 is located a half bridge switch arrangement 509 for rectifying the signal output from the isolation transformer. The signal output from the isolation transformer is smoothed by a smoothing capacitor 511 and provided to a load 513. It will be understood that, as an alternative, the half bridge switch arrangement may be replaced by a full bridge switch arrangement.

According to this embodiment, a single switchable inductive element 515 in the form of a resonant shunt inductor is provided. A single-pole single-throw relay switch 517 is provided and controlled to enable the inductive element 515 to be provided across the primary winding of the isolation transformer 507 when the resonant converter is in a first mode of operation, i.e. the inductive element 515 is arranged in parallel across the output of the resonant tank. That is, the resonant shunt inductor is placed in the circuit so that it is parallel across the second set of power conduits 209.

It will be understood that the inductive element may consist of one or more inductive elements.

In a second mode of operation, the single-pole single-throw relay switch 517 is controlled to enable the inductive element 515 to be provided across the input of the resonant tank 501. Referring to FIGS. 2A and 2B, the shunt inductor is placed in the circuit so that it is parallel across the first set of power conduits 205.

Therefore, in the first mode of operation the resonant converter is arranged to operate in a forward power transfer mode. The switchable inductive element 515 provides an effect on the power being transferred through the resonant tank by providing low loss inductive loading on the converter's output, where the converter's output is the second set of power conduits 209.

In a second mode of operation, the resonant converter is arranged to operate in a reverse power transfer mode. The switchable inductive element 515 provides an effect on the power being transferred through the resonant tank by providing a low loss inductive loading on the converter's output, where the converter's output is the first set of power conduits 205.

It will be understood that a typical value for the switchable inductive element may be chosen based on the desired forward and reverse transfer characteristics for the resonant converter.

Further, it will be understood that, as an alternative, the one or more inductive elements switched across the first set of power conduits may be different components having the same or different values to the one or more inductive elements switched across the second set of power conduits. In this manner the component values may be chosen to provide independent control of the desired forward and reverse transfer characteristics.

Further Embodiments

Figure 6:
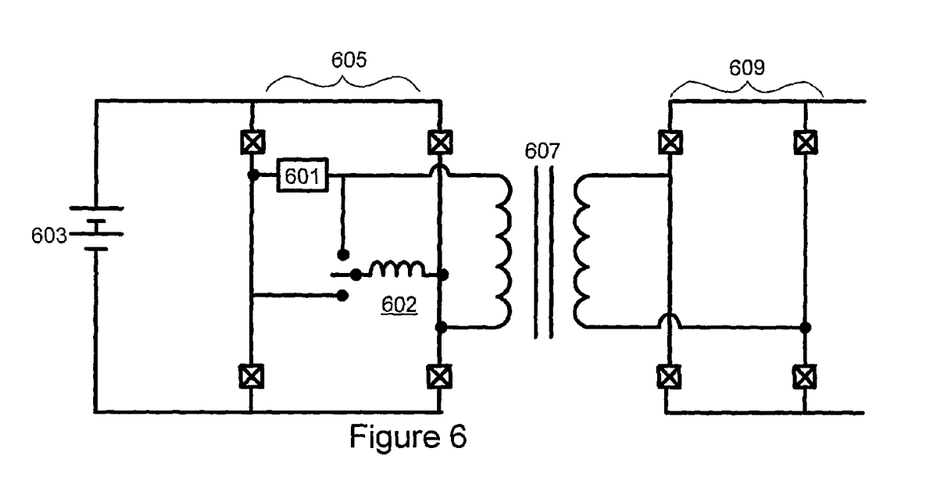
FIG. 6 shows a circuit diagram of a bidirectional resonant converter according to an embodiment of the present invention.

FIG. 6 shows a circuit diagram of a bidirectional resonant converter according to a further embodiment of the present invention.

According to this further embodiment, a similar arrangement in terms of a resonant tank 601, power source 603, first switch arrangement 605, isolation transformer 607 and second switch arrangement 609 is provided. However, according to this embodiment, the first and second switch arrangements are arranged as full bridge switching circuits.

FIGS. 7A-7E show various LC arrangements of the resonant tank for the bidirectional resonant converter according to various further embodiments of the present invention. For example, there may be practical considerations that make it a better choice from a design perspective to locate the inductor and capacitor components of the resonant tank on a particular side of the transformer.

Figure 7A:
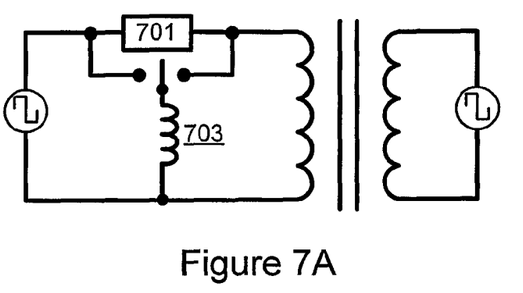
FIG. 7A shows a configuration diagram of a bidirectional resonant converter according to an embodiment of the present invention.

According to FIG. 7A, it can be seen that the LC components of the resonant tank 701 are located on the primary side of the transformer, as described above in the first embodiment. The switchable inductive element 703 is arranged so that it may be placed either across the first power conduit or across the second power conduit as indicated in FIGS. 2A and 2B.

Figure 7B:
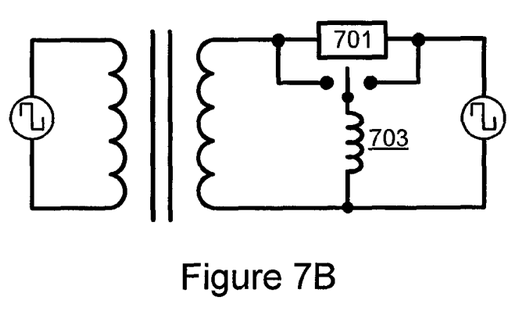
FIG. 7B shows a configuration diagram of a bidirectional resonant converter according to an embodiment of the present invention.

According to FIG. 7B, both the LC components of the resonant tank 701 are located on the secondary side of the transformer, along with the switchable inductive element 703.

Figure 7C:
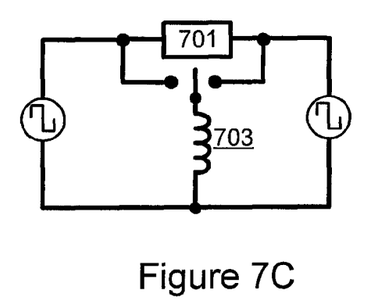
FIG. 7C shows a configuration diagram of a bidirectional resonant converter according to an embodiment of the present invention.

According to FIG. 7C, a non-isolated version of the converter is shown, where no transformer is provided to separate the input side form the output side.

Figure 7D:
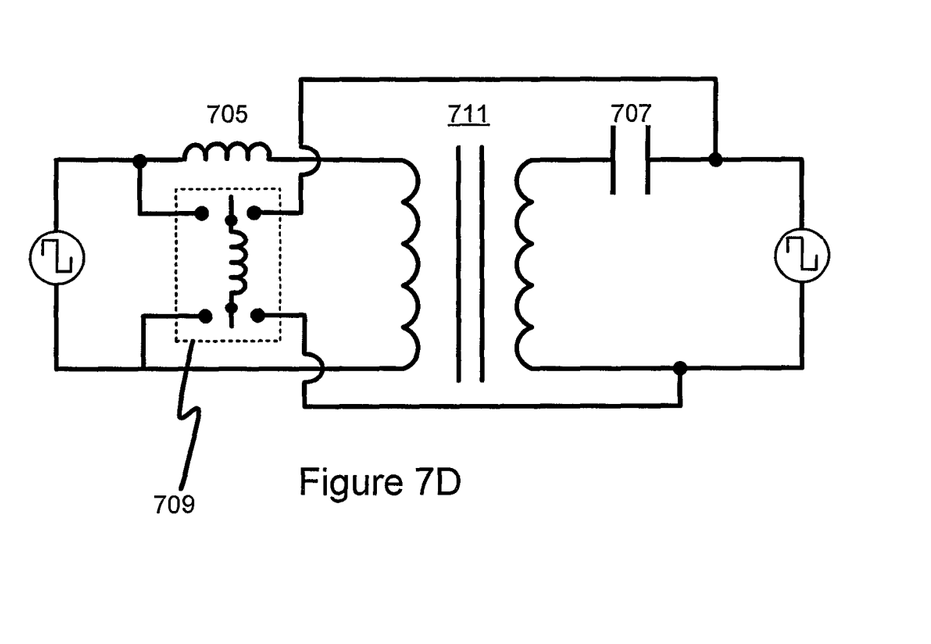
FIG. 7D shows a configuration diagram of a bidirectional resonant converter according to an embodiment of the present invention.

According to FIG. 7D, the inductive component 705 of the resonant tank is located on the primary side of the transformer 211 and the capacitive component 707 of the resonant tank is located on the secondary side of the transformer. The switchable inductive element 709 includes a double-pole double-throw relay that is arranged to position the switchable inductive element either across the second set of power conduits or across the first set of power conduits, where the second set of power conduits is located on the secondary side of the transformer and the first set of power conduits is located on the primary side of the transformer. That is, both ends of the switchable inductive element are switched across the transformer boundary. According to this example, the winding turns ratio of the transformer is 1:1. It will be understood that if the turns ratio is changed from 1:1 then alternative inductive values may be required.

Figure 7E:
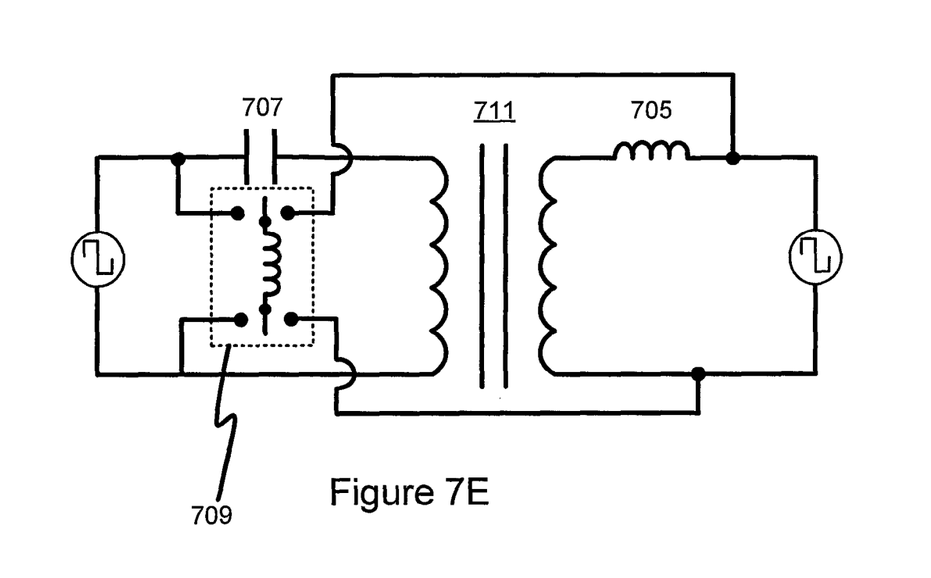
FIG. 7E shows a configuration diagram of a bidirectional resonant converter according to an embodiment of the present invention.

According to FIG. 7E, the capacitive component 707 of the resonant tank is located on the primary side of the transformer 711 and the inductive component 705 of the resonant tank is located on the secondary side of the transformer. The switchable inductive element 709 includes a double-pole double-throw relay to position the switchable inductive element either across the second set of power conduits or across the first set of power conduits, where the second set of power conduits is located on the secondary side of the transformer and the first set of power conduits is located on the primary side of the transformer. That is, both ends of the switchable inductive element are switched across the transformer boundary. According to this example, the winding turns ratio of the transformer is 1:1. It will be understood that if the turns ratio is changed from 1:1 then alternative inductive values may be required.

It will be understood that the embodiments of the present invention described herein are by way of example only, and that various changes and modifications may be made without departing from the scope of invention.

The invention claimed is:

1. A bidirectional resonant converter comprising:
   a resonant tank,
   a first switching circuit connected to the resonant tank via first conductors,
   a second switching circuit connected to the resonant tank via second conductors,
   an inductor, and
   a switch configured to connect the inductor in parallel across the second conductors in a first mode of operation and to connect the inductor in parallel across the first conductors in a second mode of operation such that connections of the inductor to the resonant tank are different in the first and second modes of operation.

2. The bidirectional resonant converter of claim 1, wherein, when operating the bidirectional resonant converter in the first mode of operation, power is transferred from the first switching circuit to the resonant tank, and from the resonant tank to the second switching circuit, and
   when operating the bidirectional resonant converter in the second mode of operation, power is transferred from the second switching circuit to the resonant tank, and from the resonant tank to the first switching circuit.

3. The bidirectional resonant converter of claim 1, wherein,
   when operating the bidirectional resonant converter in the first mode of operation, the first switching circuit is arranged to switch according to a first switching sequence and the second switching circuit is arranged to switch according to a second switching sequence,
   when operating the bidirectional resonant converter in a second mode of operation, the first switching circuit is arranged to switch according to a third switching sequence and the second switching circuit is arranged to switch according to a fourth switching sequence.

4. The bidirectional resonant converter of claim 3, wherein the second switching circuit is arranged to be a first rectifier circuit during the first mode of operation.

5. The bidirectional resonant converter of claim 4, wherein the first rectifier circuit is a first synchronous rectifier circuit that is switched according to the second switching sequence.

6. The bidirectional resonant converter of claim 3, wherein the first switching circuit is arranged to be a second rectifier circuit during the second mode of operation.

7. The bidirectional resonant converter of claim 6, wherein the second rectifier circuit is a second synchronous rectifier circuit that is switched according to the fourth switching sequence.

8. The bidirectional resonant converter of claim 1, wherein the resonant tank comprises a resonant capacitive element in series with a resonant inductive element.

9. The bidirectional resonant converter of claim 1, wherein, in a first mode of operation, the bidirectional resonant converter operates in a forward power transfer mode and in a second mode of operation the bidirectional resonant converter operates in a reverse power transfer mode.

10. The bidirectional resonant converter of claim 1 further comprising a transformer arranged between the resonant tank and the second switching circuit.

11. The bidirectional resonant converter of claim 10, wherein the transformer is one of an isolation transformer and an auto transformer.

12. The bidirectional resonant converter of claim 10, wherein the resonant tank includes a resonant capacitive element in series with a resonant inductive element.

13. The bidirectional resonant converter of claim 12, wherein the resonant capacitive element and resonant inductive element are in series on a secondary side of the transformer.

14. The bidirectional resonant converter of claim 12, wherein the resonant inductive element is on a primary side of the transformer and the resonant capacitive element is on a secondary side of the transformer.

15. The bidirectional resonant converter of claim 12, wherein the resonant inductive element is on a secondary side of the transformer and the resonant capacitive element is on a primary side of the transformer.

16. The bidirectional resonant converter of claim 12, wherein the resonant capacitive element and resonant inductive element are in series on a primary side of the transformer.

17. The bidirectional resonant converter of claim 1 further comprising a transformer arranged between the first switching circuit and the resonant tank.

18. The bidirectional resonant converter of claim 1, wherein the first and/or second switching circuit is arranged as a half bridge drive circuit.

19. The bidirectional resonant converter of claim 1, wherein the first and/or second switching circuit is arranged as a full bridge drive circuit.

20. The bidirectional resonant converter of claim 1, wherein the first and/or second switching circuit is arranged as a push-pull drive circuit.

21. The bidirectional resonant converter of claim 1, wherein the first and/or second switching circuit employs ZVT switching.

22. A method of controlling a LLC bidirectional resonant converter comprising the steps of:
   switching the bidirectional resonant converter between a first mode of operation where the bidirectional resonant converter is arranged to operate in a forward power transfer mode, and a second mode of operation where the bidirectional resonant converter is arranged to operate in a reverse power transfer mode, and
   controlling a switch of the bidirectional resonant converter based on whether the bidirectional resonant converter is operating in the first mode of operation or the second mode of operation, where the switch connects at least one inductor in parallel across first conductors connecting a first switching circuit and a resonant tank in the first mode of operation and connects the at least one inductor across second conductors connecting the resonant tank and a second switching circuit in the second mode of operation such that connections of the inductor to the resonant tank are different in the first and second modes of operation.

23. A bidirectional resonant converter comprising:
   a first bridge drive circuit having first and second ports;
   a second bridge drive circuit having first and second ports;

a resonant tank circuit connected to the first bridge drive circuit at first and second terminals of the second port of the first bridge drive circuit and connected to the second bridge drive circuit at first and second terminals of the first port of the second bridge drive circuit;

at least one inductor; and at least one switch configured to connect the inductor in parallel across the first and second terminals of the second port of the first bridge drive circuit in a first mode of operation and to connect the inductor in parallel across the first and second terminals of the first port of the second bridge drive circuit in a second mode of operation such that connections of the inductor to the resonant tank are different in the first and second modes of operation.

24. The bidirectional resonant converter of claim 23, wherein the first mode of operation provides power transfer from the first port of the first bridge drive circuit to the second port of the second bridge drive circuit and wherein the second mode of operation provides power transfer from the second port of the second bridge drive circuit to the first port of the first bridge drive circuit.

25. The bidirectional resonant converter of claim 24, wherein the second bridge drive circuit acts as a synchronous rectifier in the first mode of operation and wherein the first bridge circuit acts as a synchronous rectifier in the second mode of operation.

26. The bidirectional resonant converter of claim 23, further comprising a transformer coupling the resonant tank circuit to either the first bridge drive circuit or the second bridge drive circuit.

27. The bidirectional resonant converter of claim 23, wherein the resonant tank circuit is directly coupled to each of the first and second bridge drive circuits.

* * * * *